United States Patent
Kuzuta

[11] Patent Number: 5,103,491
[45] Date of Patent: Apr. 7, 1992

[54] WAVEGUIDE TYPE OPTICAL CIRCUIT ELEMENT

[75] Inventor: Nobuyuki Kuzuta, Atugi, Japan
[73] Assignee: Shimadzu Corporation, Kyoto, Japan
[21] Appl. No.: 566,460
[22] PCT Filed: Jan. 4, 1990
[86] PCT No.: PCT/JP90/00005
§ 371 Date: Aug. 20, 1990
§ 102(e) Date: Aug. 20, 1990
[87] PCT Pub. No.: WO90/12341
PCT Pub. Date: Oct. 18, 1990

[30] Foreign Application Priority Data
Mar. 31, 1989 [JP] Japan .................................. 1-82458
Aug. 25, 1989 [JP] Japan ................................. 1-219246

[51] Int. Cl.$^5$ .................................................. G02B 6/10
[52] U.S. Cl. ............................................. 385/9; 385/21; 385/28; 385/41; 385/50
[58] Field of Search ............... 350/96.11, 96.12, 96.13, 350/96.14

[56] References Cited

U.S. PATENT DOCUMENTS

| | | | |
|---|---|---|---|
| 4,243,295 | 1/1981 | Alferness | 350/96.14 |
| 4,291,939 | 9/1981 | Giallorenzi et al. | 350/96.14 |
| 4,390,236 | 6/1983 | Alferness | 350/96.14 |
| 4,679,893 | 7/1987 | Ramer | 350/96.14 |
| 4,711,515 | 12/1987 | Alferness | 350/96.14 |
| 4,865,408 | 9/1989 | Korotky | 350/96.13 |
| 4,917,449 | 4/1990 | Granestrand | 350/96.14 |
| 4,997,245 | 3/1991 | DuPuy et al. | 350/96.14 |

FOREIGN PATENT DOCUMENTS 56-110916 9/1981 Japan .
62-299825 12/1987 Japan .
63-142333 6/1988 Japan .
1-118821 5/1989 Japan .

Primary Examiner—Frank Gonzalez
Attorney, Agent, or Firm—Armstrong, Nikaido, Marmelstein, Kubovcik & Murray

[57] ABSTRACT

A waveguide type optical circuit element having a directional coupler for converting light intensity between two waveguides, which is used as a polarity-independent optical switch or a variable optical divider for optical fiber communications and the like. The two waveguides (2), (3) have a coupling section length which is in a TE mode about three times a complete coupling length of the TE mode, and in a TM mode about one time a complete coupling length of the TM mode. Electrodes (4), (5) comprise three-part electrodes of different lengths which act as reverse $\Delta\beta$ electrodes for alternately reversing a direction of an electric field. This construction promotes the light-confinement effect of the waveguides, reduces the drive voltage necessary for carrying out an optical switching operation, and realizes optimal element characteristics in accordance with a ratio of variations in the propagation coefficient in the TE mode and TM mode of the directional coupler manufactured.

1 Claim, 10 Drawing Sheets

Fig. 1
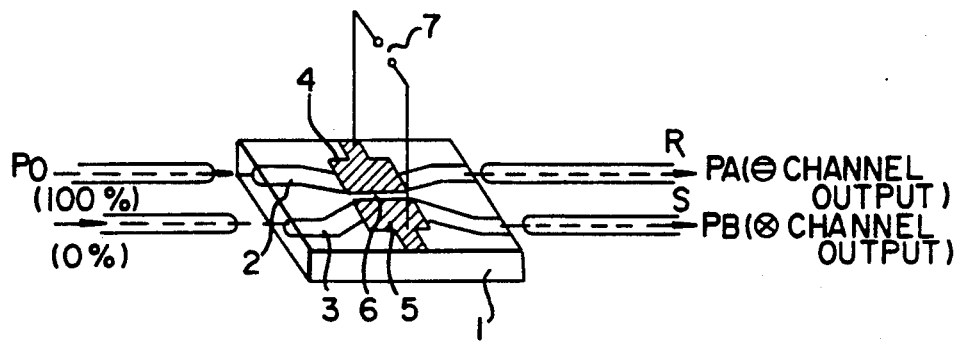
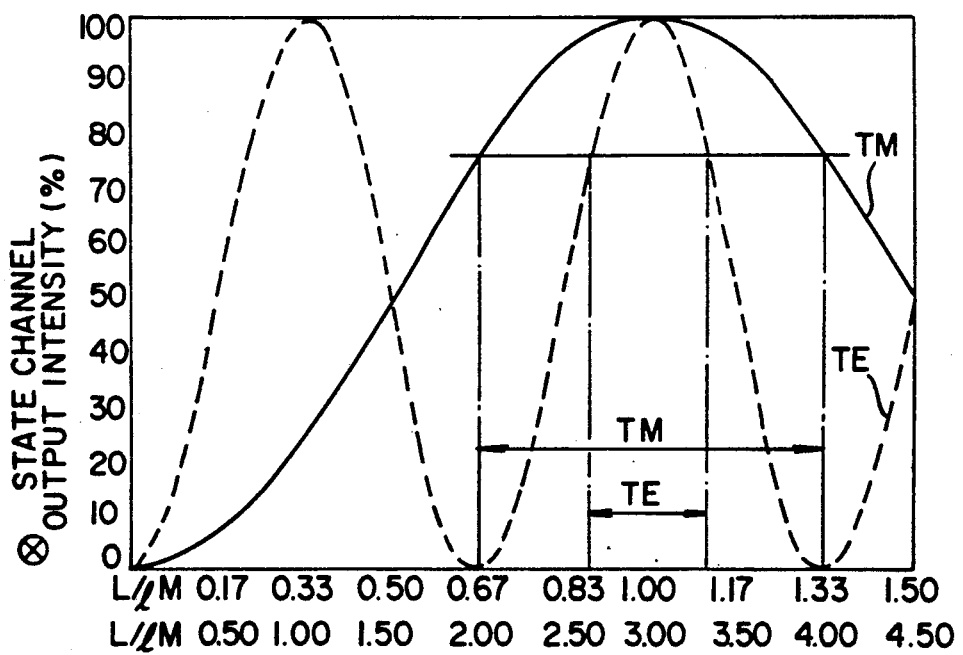
Fig. 2

Fig.10
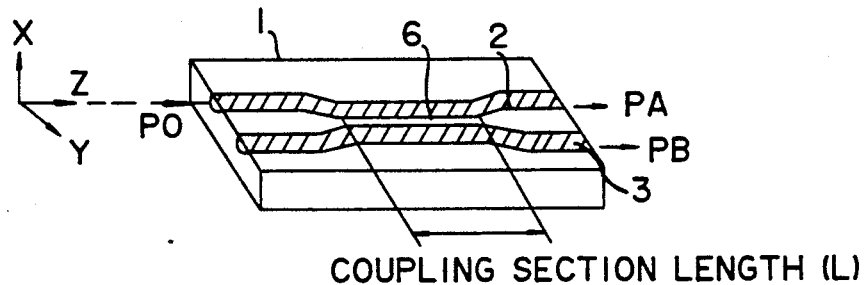
Fig.11A
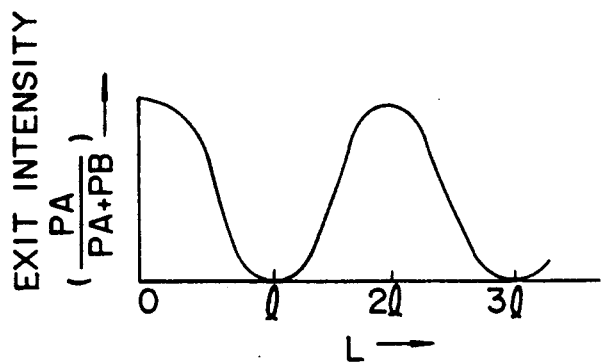
Fig.11B
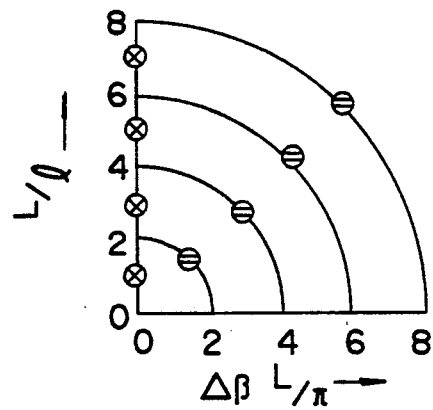
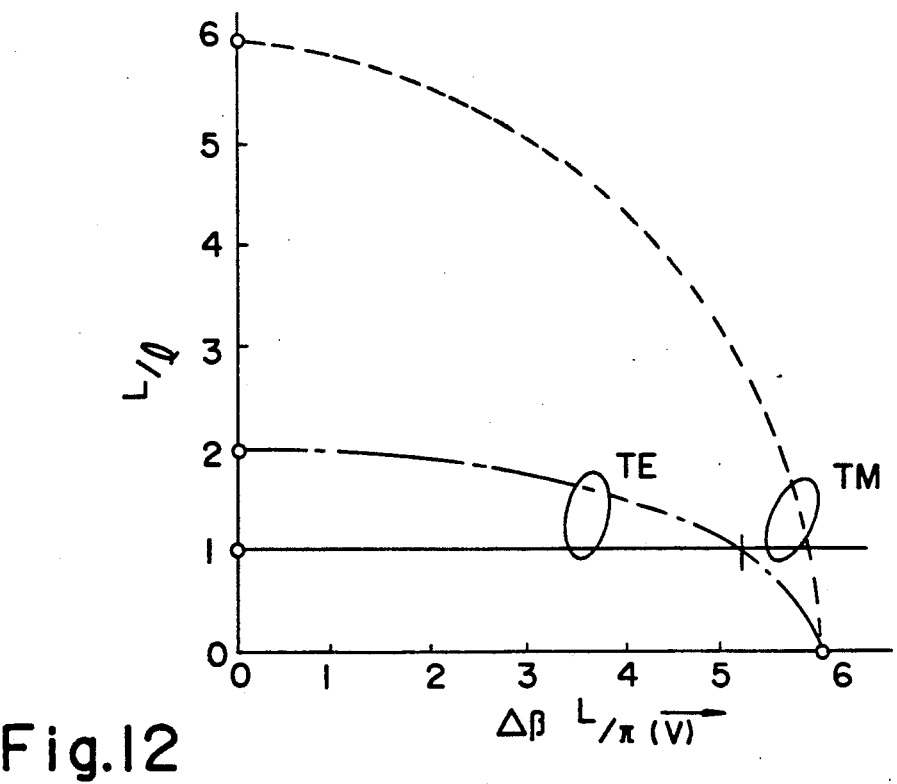
Fig.12

WAVEGUIDE TYPE OPTICAL CIRCUIT ELEMENT

TECHNICAL FIELD

This invention relates to a waveguide type optical circuit element using a directional coupler, and particularly to a waveguide type optical circuit for use in optical fiber communications, which has an excellent effect of shutting light in optical waveguides and has reduced polarity-dependence.

BACKGROUND ART

Conventionally, this type of waveguide type optical circuit element includes, as a principal part thereof, a directional coupler as schematically shown in FIG. 10. In this figure, a conventional waveguide type optical circuit element, such as a polarity-independent optical switch, has a lithium niobate ($LiNbO_3$ hereinafter) substrate 1 defining two waveguides 2 and 3, parts of the waveguides 2 and 3 being close to each other to form a coupling section 6. When light of intensity PO enters one of the waveguides 2 from a left incident end surface, it varies depending on coupling length L of the coupling section 6 where the parts are close to each other, and lights of varied intensities PA, PB exit the respective waveguides 2 and 3 from a right exit end surface. The first length l for the exit lights of intensities PA, PB to be in the relationship $PA/(PA+PB) \approx 0$ is called a complete coupling length. FIG. 11(A) shows the relationship of exit lights PA, PB with the complete coupling length l. Generally, the complete coupling length l varies according to the polarization state of incident light, namely whether the TE mode or TM mode. Here TE mode refers to a polarization state in which electric field components are parallel to the substrate 1, and TM mode refers to a polarization state in which the electric field components are vertical to the substrate 1. It is to be noted that the two waveguides 2 and 3 have an identical structure.

The conventional directional coupler of the polarity-independent optical switch acting as a waveguide type optical circuit element includes a pair of electrodes (not shown) in the coupling section 6 to be the uniform $\Delta\beta$ type, and is capable of switching incident light in accordance with the electro-optical effect produced by applying an electric field. This switching state is shown in FIG. 11(B) as a uniform $\Delta\beta$ switching diagram. In this figure, ⊖ state (bar state) indicates a state where incident light intensity PO corresponds to exit light intensity PA, with the other exit light intensity PB=0, and ⊗ state (cross state) indicates a state where incident light intensity PO corresponds to exit light intensity PB, with the other exit light intensity PA=0. The ⊗ state appears on a plurality of circular arcs when an electric field ($\Delta\beta \cdot L/\pi$) is applied.

Next, FIG. 12 shows switching diagrams of both the TE and TM modes where an electric field is applied with the ratio L/l between coupling section length L and complete coupling length l is "1" (L/l=1) for both the TM mode and TE mode. In this figure, as the electric field is applied to increase $\Delta\beta \cdot L/\pi$, the TE mode becomes ⊖ state at $\Delta\beta \cdot L/\pi \approx 5.2$ and, as the electric field is applied further to increase $\Delta\beta \cdot L/\pi$, the TM mode becomes ⊖ state at $\Delta\beta \cdot L/\pi \approx 5.9$. In this way, switching of incident light is made by changing both the TE and TM modes from ⊗ state to ⊖ state.

Another conventional polarity-independent optical switch comprising a waveguide type optical circuit element is described in ELECTRONICS LETTERS Oct. 8, 1987 Vol. 23, No. 21, pages 1167–1168, which is shown in FIG. 13. In this figure, the conventional polarity-independent optical switch has a $LiNbO_3$ substrate 1 defining two waveguides 2 and 3, a pair of electrodes 4 and 5 arranged on the two waveguides 2 and 3, and another pair of electrodes 45 and 55 arranged outwardly of the pair of electrodes 4 and 5.

In the above construction, the condition for both the TE and TM modes to become ⊖ state with the same voltage applied to the electrodes 4, 5, 45 and 55 is determined by electro-optical coefficients $\gamma 13$ and $\gamma 33$ of the $LiNbO_3$ substrate 1. FIG. 14 shows the crosstalk of the TE and TM modes for $\Delta\beta$ (corresponding to the applied voltage) in this case. In this figure, $\alpha = \Delta\beta TE/\Delta\beta TM$ ($\Delta\beta TE$, $\Delta\beta TM$ being phase mismatches of the directional coupler for the TE and TM modes, respectively). When $0.25 \leq \alpha \leq 0.34$, the crosstalk can be made $-20$ dB or less for both modes by adjusting the applied voltage. The actual value in the vicinity of 1.3 $\mu$m wavelength is $\alpha = 0.29$ which satifies the above condition, and therefore the voltage for producing ⊖ state may be equalized for both the TE and TM modes.

Still another conventional polarity-independent optical switch comprising a waveguide type optical circuit element is described in ELECTRONICS LETTERS Sept. 15, 1988 Vol. 24, No. 19, pages 1198–1200. This conventional polarity-independent optical switch secures the polarity independence by using an X-cut crystal which produces the electro-optical effect equally for both the TE and TM modes in the case of an optical crystal such as $LiNbO_3$.

Since the conventional waveguide type optical circuit element is constructed as noted above, $\Delta\beta \cdot L/\pi$ for mode switching is different between the TE mode and TM mode as shown in the switching diagram of FIG. 12, which has the problem that polarity independence cannot be made perfect. In another conventional waveguide type optical circuit element, an equal complete coupling length for the TE and TM modes is obtained relatively close to a cut-off condition. However, since the optical waveguides are thin and produces a weak confinement effect, waveguide propagation loss and radiation loss at curved portions of the waveguides tend to be large. Thus, there is the problem of requiring a measure such as for increasing the waveguide width at the curved portions. The waveguide type optical circuit element using the X-cut crystal has a weak electro-optical effect available, and therefore has the problem of necessitating a high drive voltage.

This invention has been made to solve such problems, and its object is to provide a waveguide type optical circuit element which has reduced polarity dependence, provides waveguides that have excellent light confining effect, and requires a reduced drive voltage.

DISCLOSURE OF THE INVENTION

In this invention, a directional coupler formed on a waveguide type optical circuit element has a coupling section length which is in a TE mode about three times a complete coupling length of the TE mode, and in a TM mode about one time a complete coupling length of the TM mode. This allows waveguides to be formed thick in a substrate, which secures a very good light-confining effect of the waveguides, and reduces radiation loss at curved portions of the waveguides.

Further, according to this invention, electric field applying electrodes formed on the waveguide constituting the directional coupler comprise three-part electrodes which act as reverse $\Delta\beta$ electrodes for alternately reversing a direction of an electric field. This reduces the drive voltage necessary for carrying out an optical switching operation, and realizes optimal element characteristics by varying lengths of the three electrodes in accordance with a ratio of variations in the propagation coefficient in the TE mode and TM mode of the directional coupler manufactured.

BRIEF DESCRIPTION OF THE DRAWINGS

FIG. 1 is a schematic view showing the principle of a waveguide type optical circuit element according to this invention.

FIG. 2 is a graph of relationship of channel output intensity in ⊗ state with perfect coupling length.

FIG. 10 is a schematic view of a conventional waveguide type optical circuit element.

FIG. 11(A) is a graph of relationship of exit light intensity with complete coupling length.

FIG. 11(B) is a switching diagram of uniform $\Delta\beta$.

FIG. 12 is a switching diagram of TE and TM modes.

BEST MODE FOR CARRYING OUT THE INVENTION

Figure 3:
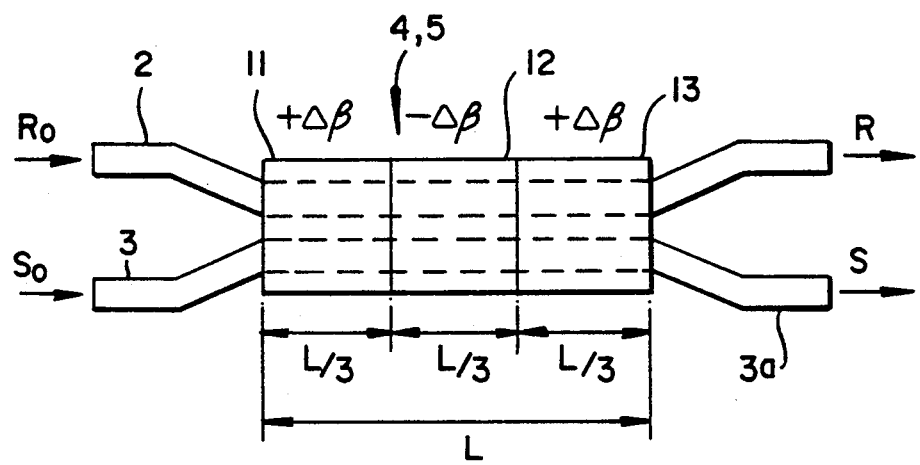
FIG. 3 is a plan view of an element according to one embodiment of this invention.

This invention will be described with reference to the drawings for illustrating the same in greater detail.

FIG. 1 is a schematic view, for illustrating the principle of this invention, of polarity-independent optical switch acting as a waveguide type optical circuit element. In this figure, the waveguide type optical circuit element comprises a directional coupler having a LiNbO$_3$ substrate 1 defining two waveguides 2 and 3, parts of the waveguides 2 and 3 being close to each other to form a coupling section 6. The coupling section 6 has coupling section length L for the TE mode about three times complete coupling length lTE for the TE mode, and for the TM mode about one time complete coupling length lTM for the TM mode. Electrodes 4 and 5 for applying a switching voltage V are formed on the waveguides 2 and 3 constituting the coupling section 6 to convert light intensity between the two waveguides 2 and 3.

Operation of the above element will be described in detail in relation to channel output intensity with reference to FIG. 2. This FIG. 2 is a light intensity graph showing relationship of channel output intensity in state with the complete coupling length. In this figure, numerical ranges are defined as $2.7 \leq L/lTE \leq 3.3$ for the TE mode and $0.7 \leq L/lTM \leq 1.3$ for the TM mode, and these numerical ranges are defined from the view point of input loss. Where these complete coupling lengths are $2.7 \leq L/lTE \leq 3.3$ and $0.7 \leq L/lTM \leq 1.3$, the channel output light intensity in ⊗ state may have a lower limit at about 75%. Since this approximately 75% channel output light intensity has an input loss of about $-1.25$ dB, it is permissible as a practical range with a greater input loss. Thus, by setting the input loss to a range of about $-2$ dB, the complete coupling lengths for the TE and TM modes may be $2.6 \leq L/lTE \leq 3.4$ and $0.6 \leq L/lTM \leq 1.4$.

Next, the above waveguide type optical circuit element will be described in relation to a manufacturing method. Generally, Ti (titanium) diffusion is most commonly used as a method of forming the waveguides 2 and 3 on the LiNbO$_3$ substrate 1. With the waveguides 2 and 3 formed by the Ti diffusion method, it is easy to increase refractive index variation $\Delta$ne for extraordinary rays over refractive index variation $\Delta$no for ordinary rays. In other words, it is easy with the LiNbO$_3$ substrate 1 of Z-cut crystal to increase the complete coupling length for the TM mode over the complete coupling length for the TE mode. By appropriately setting the width of the waveguides 2 and 3, spacing between the two waveguides 2 and 3, and conditions for the Ti diffusion, it is easy to make the coupling section length L of the directional coupler about three times and one time the complete coupling lengths in the TE and TM modes. This allows the waveguides to be formed thick on the substrate for a sufficient light confinement effect.

Figure 4:
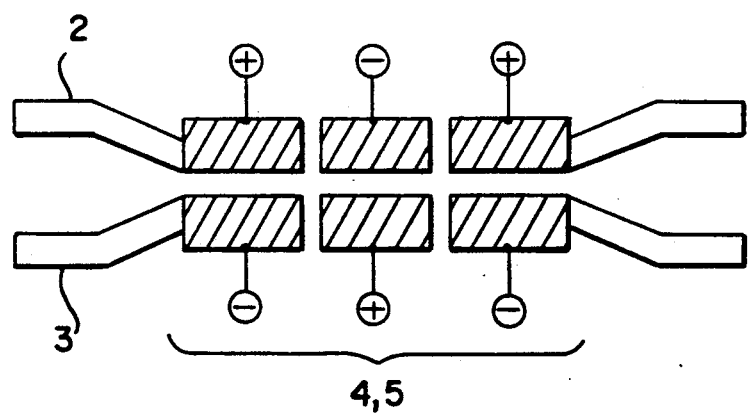
FIG. 4 is a plan view showing the way in which electrodes in the same element are charged.

Next, an embodiment in which the electrodes of the above waveguide type optical circuit element are divided into three parts will be described. As shown in FIGS. 3 and 4, this embodiment has electrodes 4 and 5 divided into three electrodes 11, 12 and 13 acting as reverse $\Delta\beta$ electrodes for alternately reversing the direction of the electric field. That is, this directional coupler has a coupling section length L, with each of the electrodes 11-13 having a length L/3, and an equal voltage of opposite polarity is applied to an adjacent pair of electrodes. This enables a reduction of the drive voltage necessary for an optical switching operation.

The above directional coupler is manufactured so that the coupling section length L satisfies the relations of $2.7 \leq L/lTE \leq 3.3$ and $0.7 \leq L/lTM \leq 1.3$ with complete coupling lengths lTE and lTM for the TE mode and the TM mode as already described. With the above electrode construction, the waveguides undergo variations in the propagation constant such as $+\Delta\beta$, $-\Delta\beta$ and $+\Delta\beta$ between the respective divisions as shown in FIG. 3. These propagation coefficient variations differ between the TE mode and TM mode, and the difference is expressed by the following equation:

$$\frac{\Delta\beta TM}{\Delta\beta TE} = \frac{ne^3 \gamma 33 \sqrt{TM}}{no^3 \gamma 13 \sqrt{TE}} = a \approx 3 \qquad (1)$$

where $\Delta\beta$TE is a propagation constant variation in the TE mode, $\Delta\beta$TM is a propagation constant variation in the TM mode, ne is a refractive index of extraordinary rays, no is a refractive index of ordinary rays, γ33 and γ13 are electro-optical constants,
√TE is an overlapping integral of applied electric fields in the TE mode, and
√TM is an overlapping integral of applied electric fields in the TM mode.

Figure 5A:
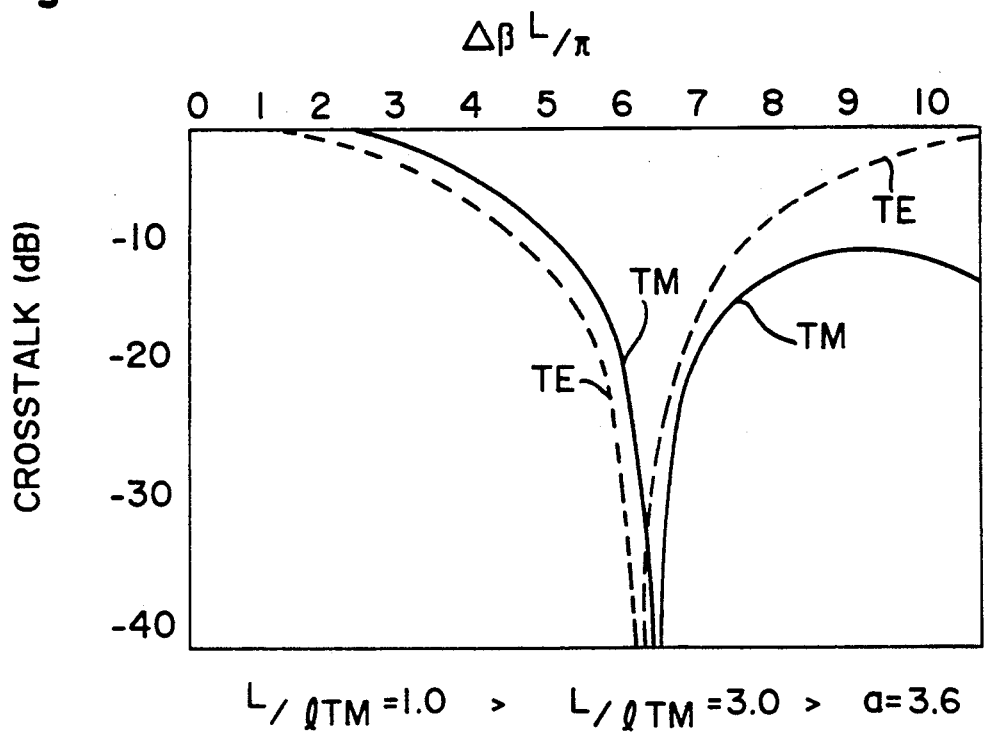
FIGS. 5(A), (B) are graphs showing element characteristics of the element according to this embodiment.
Figure 5B:
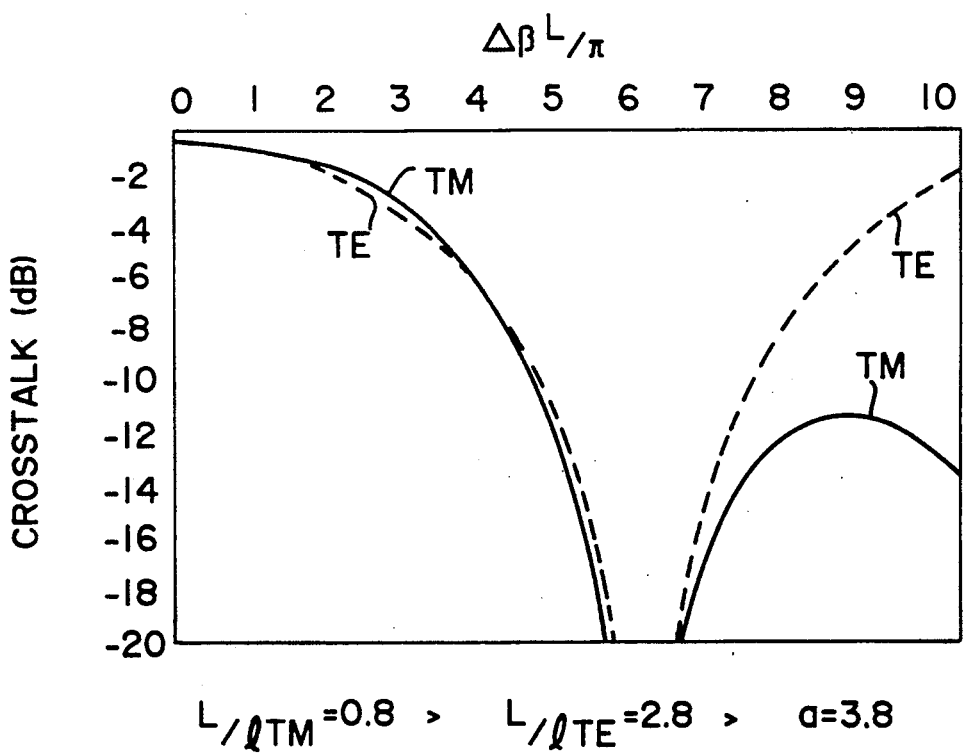

FIGS. 5(A) and (B) show element characteristics of this embodiment having the electrodes divided into three parts as shown in FIGS. 3 and 4. In these figures, the horizontal axis represents $\Delta\beta \cdot L/\pi$ for the TM mode, and the vertical axis represents the power ratio $-10 \log(S/Ro)$ of output light power from waveguide 3a with intensity S in the TE mode and TM mode with respect to the incident light power of Ro where light power "1" enters the waveguide 2 with intensity Ro and light power "0" enters the waveguide 3. In the figures, the solid lines indicate the light in the TM mode, while the broken lines indicate the light in the TE mode. FIG. 5(A) shows element characteristics under conditions L/lTM=1.0, L/lTE=3.0 and a=3.6, and FIG. 5(B) shows element characteristics under conditions L/lTM=0.8, L/lTE=2.8 and a=3.8. FIG. 5(A) shows that the element in this embodiment has characteristics of an optical switch. That is, incident light is all output as S where $\Delta\beta \cdot L/\pi = 0$, and crosstalk = $-20$ dB or less is obtained where $\Delta\beta \cdot L/\pi \approx 5.8$. On the other hand, FIG. 5(B) shows the case of the coupling section length L of directional coupler being varied slightly and a=3.8. As shown, the output light intensities in the TE and TM modes vary in a manner substantially corresponding to variations of $\Delta\beta \cdot L/\pi$. However, since the coupling section length L is varied slightly, allowance must be made for an input loss of about 0.5 dB where $\Delta\beta \cdot L/\pi = 0$. It is difficult to obtain from other devices the characteristic that, despite the occurrence of such an input loss, the output intensities of light in the TE and TM modes vary equally with the variations of $\Delta\beta \cdot L/\pi$. Waveguide type optical circuit elements such as a branching ratio variable optical divider and an information distributing optical switch can be realized by utilizing this characteristic.

To obtain the optimal element characteristic as shown in FIG. 5(B) with the above embodiment, $a \approx 3.8$ is made with the length of each electrode equally divided into L/3. However, since the value of "a" generally is determined by the state of the waveguides confining light and by the electro-optical constant, it is difficult to freely select the value of "a" for the optimal element characteristic. Therefore, the optimal element characteristic may be obtained by noting the value "a" of the directional coupler manufactured and setting the length of each electrode on the basis of this value.

Figure 6:
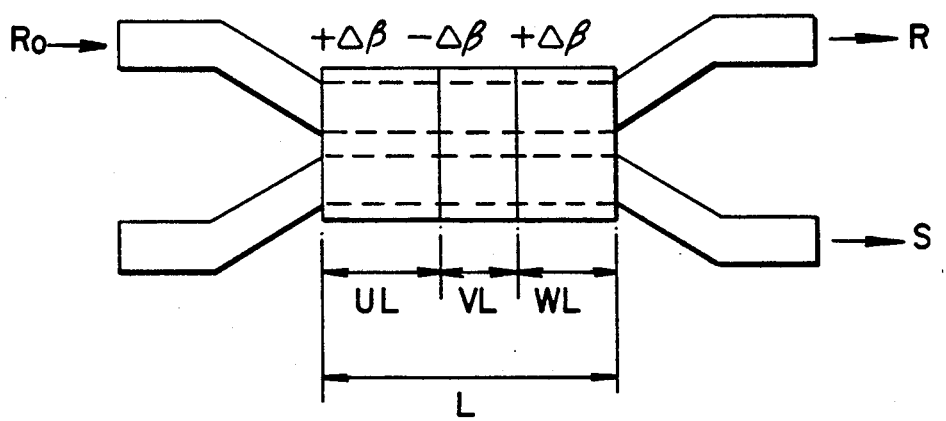
FIG. 6 is a plan view of an element according to another embodiment of this invention.

FIG. 6 shows a directional coupler designed from the above point of view. It differs from the directional coupler shown in FIG. 3 in that the length of each electrode is not equally divided into L/3 but the length of each is divided into different lengths in accordance with the value of "a".

Figure 7A:
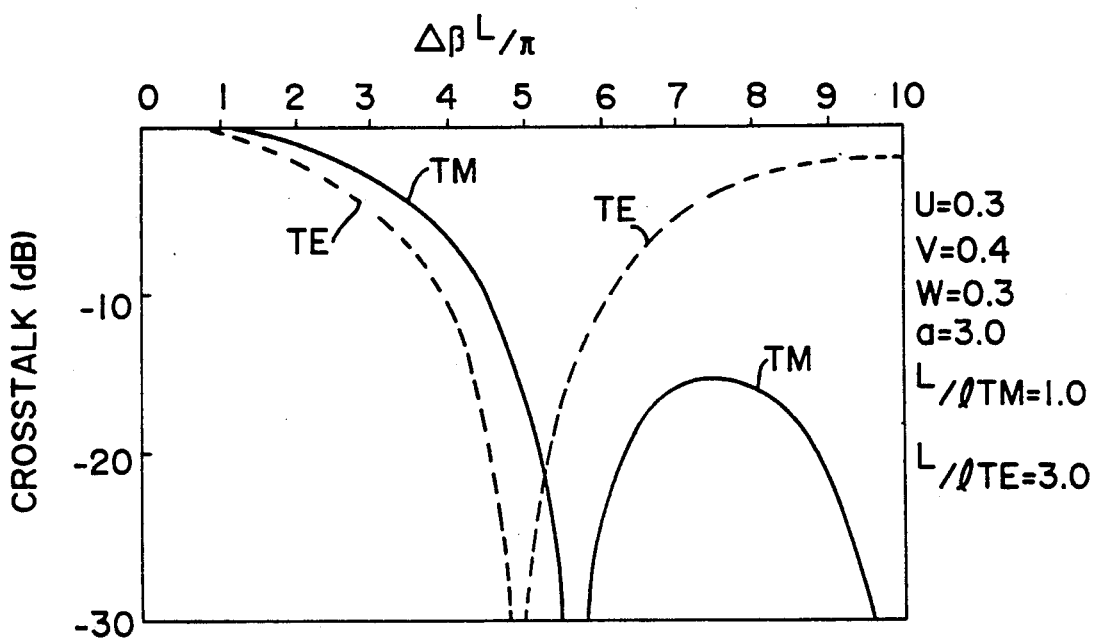
FIGS. 7(A), (B), (C) and FIGS. 8(A), (B) are graphs showing element characteristics of elements according to different embodiments of this invention.
Figure 7B:
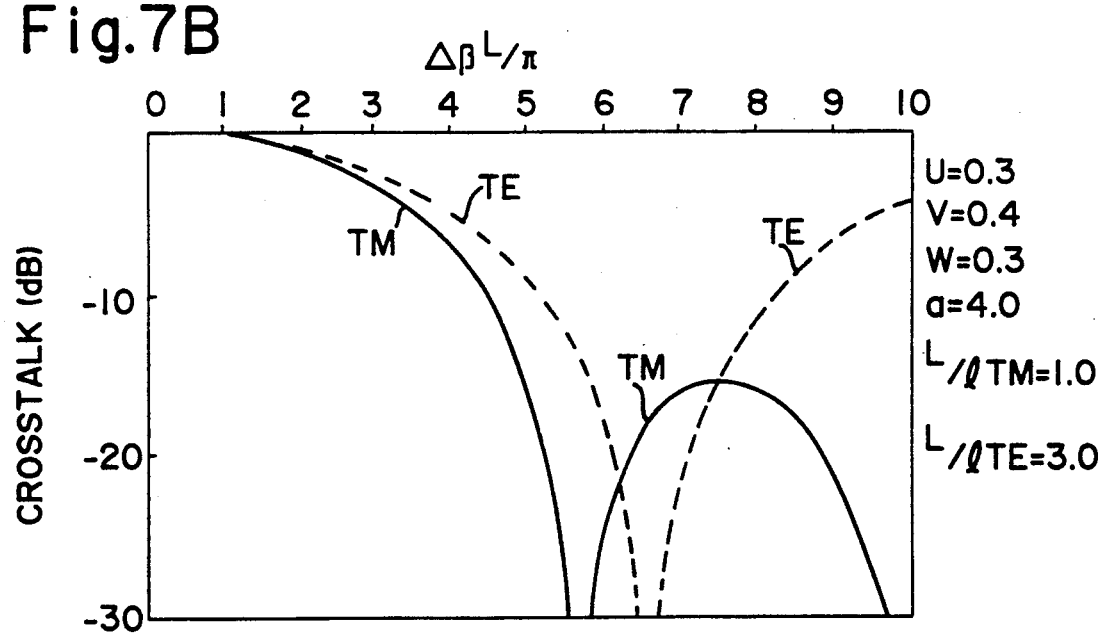
Figure 7C:
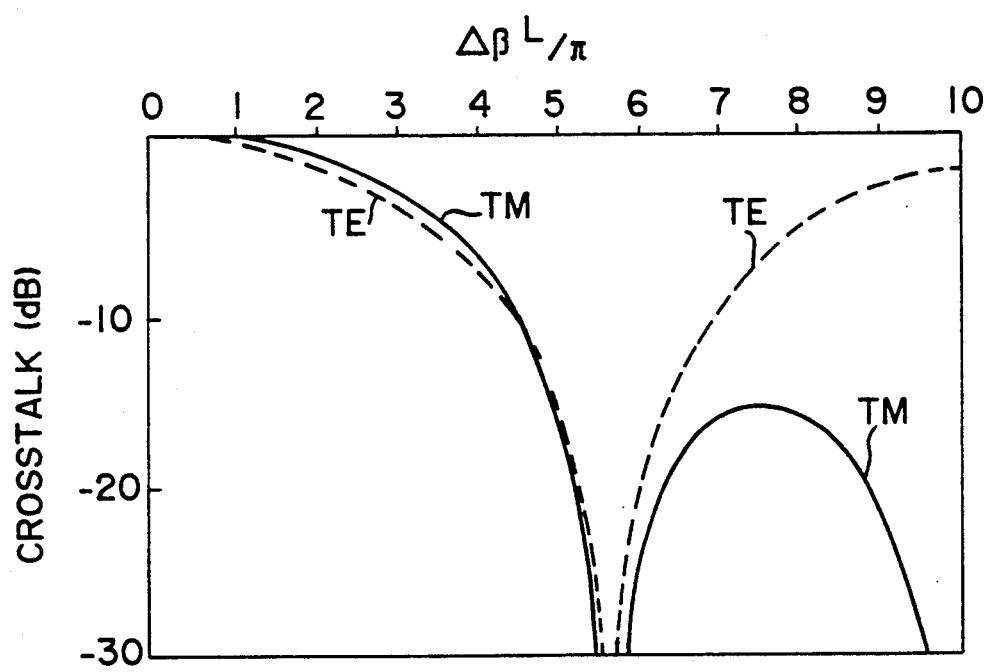

FIG. 7(A) shows switch characteristics calculated where a directional coupler of a($\Delta\beta$TM/$\Delta\beta$TE)=3 is set with L/lTM=1, L/lTE=3, u=0.4, v=0.3 and w=0.4 to act as an optical switch. FIG. 7(B) shows optical switch characteristics calculated where a directional coupler of a=4 is set with the above values. As seen from these characteristics figures, the characteristic of 20 dB crosstalk can be obtained over a wide range of $3 \leq a \leq 4$ for the light in both the TE and TM modes. Further, as seen from FIG. 7(C), the values of L/lTM=1, L/lTE=3, u=0.3, v=0.4 and w=0.3 provide the best characteristic for an optical switch when the directional coupler has a=3.4. In this way, the optimal characteristic of an optical switch may be obtained by determining the values of u, v and w after noting the value of a.

Figure 8A:
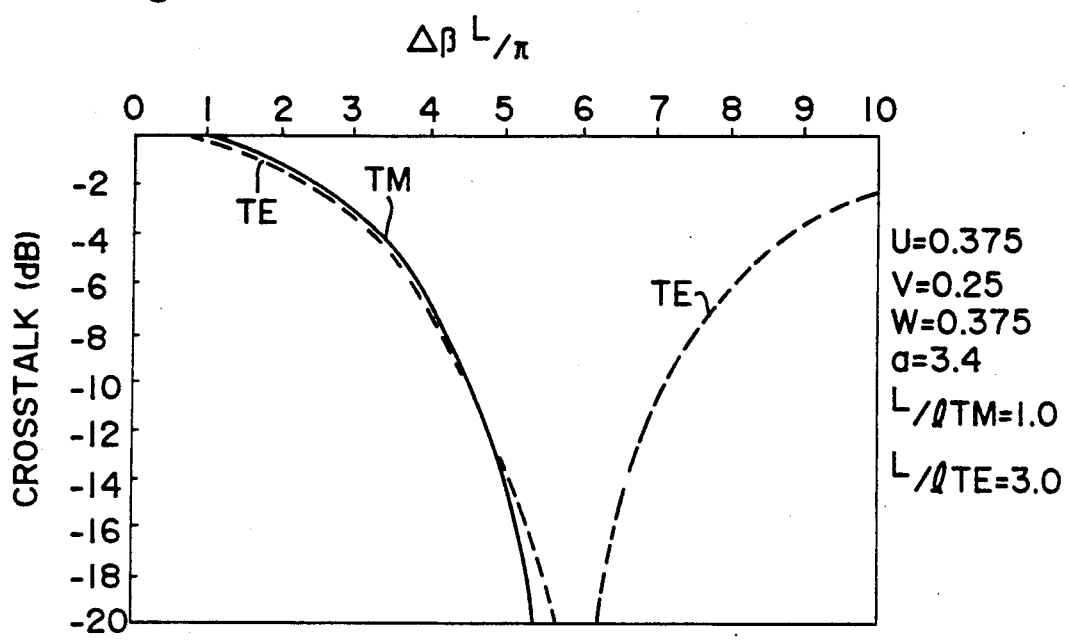

Further, FIG. 8(A) shows switch characteristics calculated where a directional coupler of a=3.4 is set with L/lTM=1, L/lTE=3, u=0.375, v=0.25 and w=0.375 to act as a branching ratio variable optical divider. As seen from this characteristic figure, the output intensities of light vary equally with the variations of $\Delta\beta \cdot L/\pi$ for TM and TE modes.

Figure 8B:
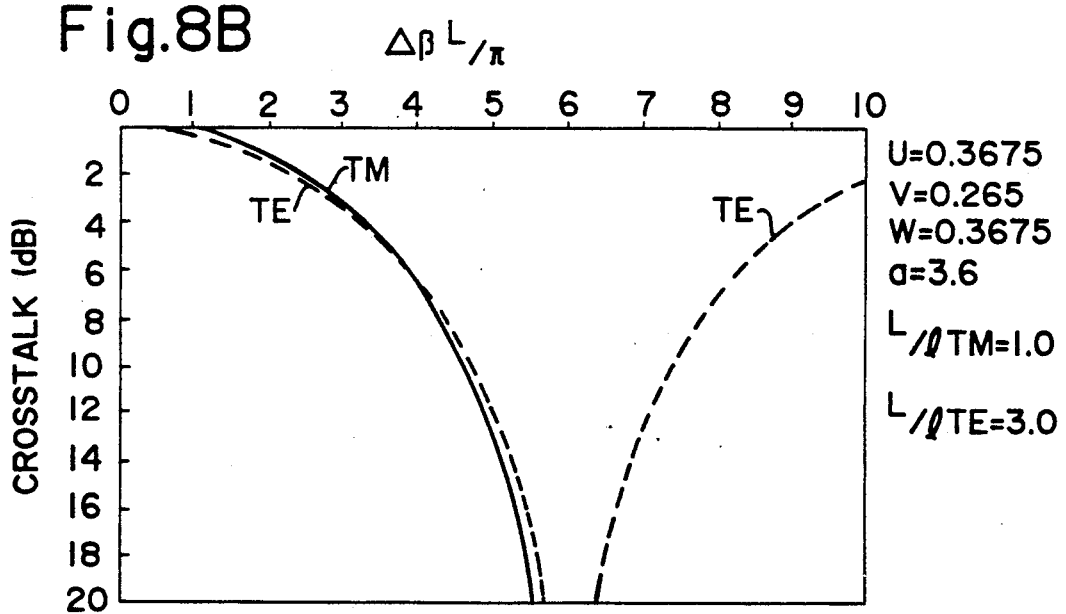
Figure 9A:
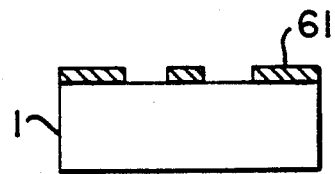
FIGS. 9(A)-(F) are front views of an element showing a manufacturing process of the element.
Figure 9B:
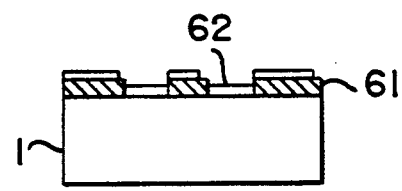
Figure 9C:
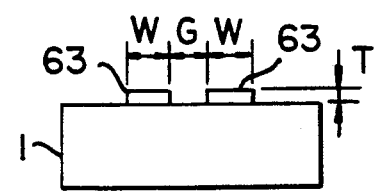
Figure 9D:
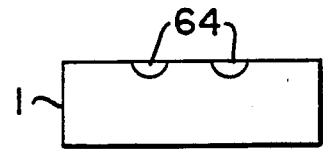
Figure 9E:
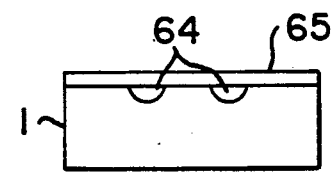
Figure 9F:
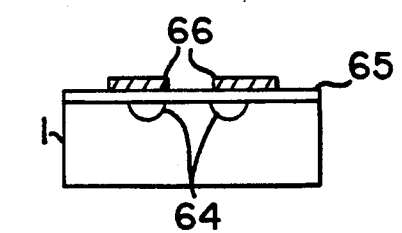
Figure 13:
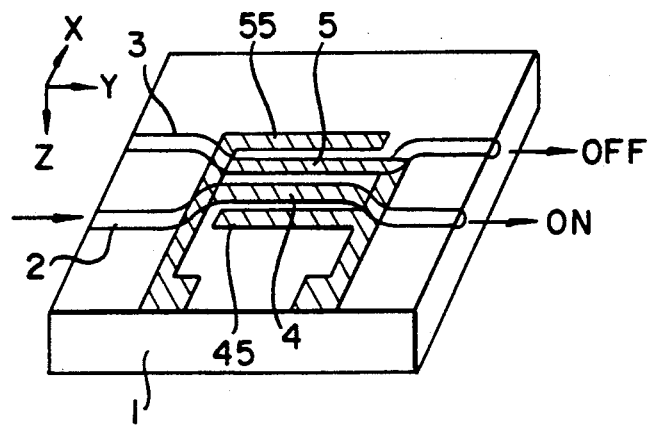
FIG. 13 is a schematic view of another conventional element.
Figure 14:
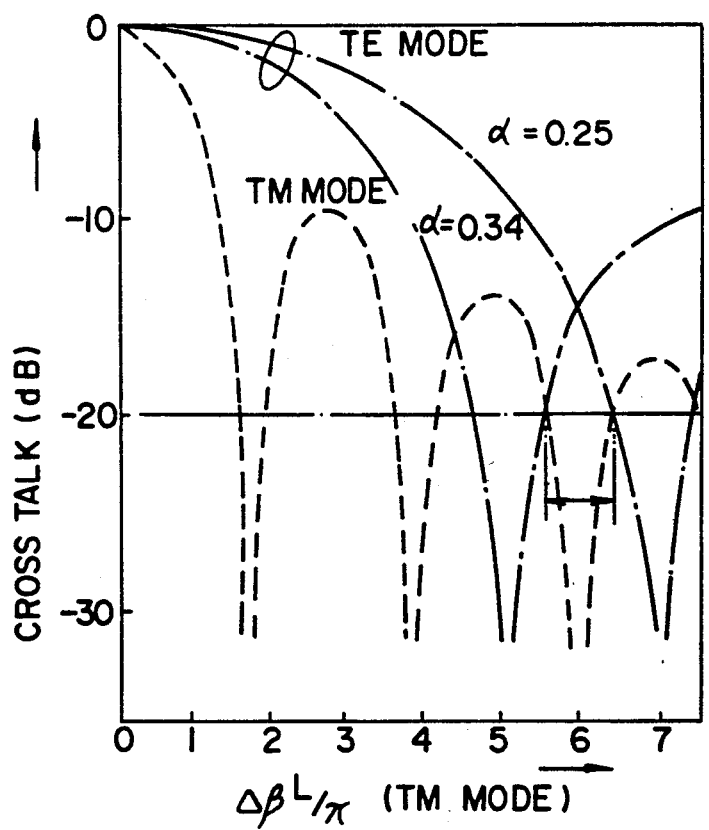
FIG. 14 is a view showing a graph of relationship of input loss with switching voltage in the TE mode.

FIG. 8(B) shows optical switch characteristics calculated where a branching ratio variable optical divider is set with a=3.6, L/l TM=1, L/l TE=3, u=0.3675, v=0.265 and w=0.375. In this example also, the output intensities of light vary equally with the variations of $\Delta\beta \cdot L/\pi$ for the TM and TE modes.

As described above, characteristics can be optimized for the optical switch and for the variable optical divider by designing the respective electrode lengths u, v and w (u+v+w=1) in accordance with the value of "a" instead of equalizing the electrode lengths.

FIGS. 9(A)–(F) show a process of manufacturing the element in this embodiment. As shown, a photoresist 61 defining waveguide patterns is formed on the Z-cut LiNbO$_3$ substrate 1 (FIG. 9(A)). Next, Ti 62 is deposited as a diffusion source on the substrate 1 having the photoresist 61 (FIG. 9(B)). Next, the photoresist 61 is removed from the substrate 1 by using an organic solvent whereby the Ti forms lift-off parts 63 having a width W, a gap G and a height T (FIG. 9(C)). Next, the substrate 1 having the lift-off parts 63 of the optical waveguide patterns is heated to a high temperature to spread the Ti acting as the diffusion source, thereby forming the optical waveguides 64 (FIG. 9(D)). Next, after a SiO$_2$ film 65 having a thickness of 4000 Å, for example, is formed as a buffer layer on the surface of the substrate 1 defining the optical waveguides 64 (FIG. 9(E)), electrodes 66 are formed on the SiO$_2$ film 65 above and opposite the optical waveguides 64 (FIG. 9(F)). Since the electrodes 66 comprise a metal, the SiO$_2$ film 65 is formed in order to avoid light absorption by the metal. In order to satisfy the conditions of the above coupling section, it is necessary to appropriately set the dimensions W, G and T in FIG. 9(C) and conditions for diffusion.

INDUSTRIAL APPLICABILITY

As described above, the waveguide type optical circuit element according to this invention is useful as a polarity-independent optical switch or a variable optical divider for optical fiber communications and the like.

I claim:

1. A waveguide type optical circuit element comprising: a directional coupler with two waveguides disposed close to each other, and electric field applying electrodes mounted on the waveguides for converting light intensity between the two waveguides, wherein said directional coupler has a coupling section length which is in a TE mode about three times a complete coupling length of the TE mode, and in a TM mode about one time a complete coupling length of the TM mode, and wherein said electrodes comprise three-part electrodes of different lengths which act as reverse $\Delta\beta$ electrodes for alternately reversing a direction of an electric field.

* * * * *